United States Patent [19]

Buckley

[11] 3,922,648

[45] Nov. 25, 1975

[54] METHOD AND MEANS FOR PREVENTING DEGRADATION OF THRESHOLD VOLTAGE OF FILAMENT-FORMING MEMORY SEMICONDUCTOR DEVICE

[75] Inventor: William D. Buckley, Troy, Mich.

[73] Assignee: Energy Conversion Devices, Inc., Troy, Mich.

[22] Filed: Aug. 19, 1974

[21] Appl. No.: 498,299

[52] U.S. Cl. .............................. 340/173 R; 307/238
[51] Int. Cl.² .............................................. G11C 11/40
[58] Field of Search ...................... 340/173 R, 173 A

[56] References Cited

UNITED STATES PATENTS

| | | | |
|---|---|---|---|
| 3,719,933 | 3/1973 | Wakabayashi | 340/173 R |
| 3,827,033 | 7/1974 | Quilliam | 340/173 R |
| 3,846,767 | 11/1974 | Cohen | 340/173 R |

*Primary Examiner*—Terrell W. Fears
*Attorney, Agent, or Firm*—Wallenstein, Spangenberg, Hattis & Strampel

[57] ABSTRACT

The number of set and reset cycles to which a filament-type amorphous memory switch device can be operated without threshold degradation is found unexpectedly to be a function of reset current pulse width, the number of reset current pulses used to effect each resetting operation and the spacing of the reset current pulses. In one case, for low current reset, it was determined each reset operation should comprise a burst of at least about 10 and preferably about 50–150 reset current pulses to effect homogenization of the reset filament, each reset current pulse should be substantially under 10 microseconds in width, and the pulse spacing should be substantially less than the threshold recovery period of the memory switch device, preferably much less than 10 microseconds. Such a burst of a large number of reset current pulses are particularly useful in setting memory switch devices in very low current rated circuits. In such case, the initial low amplitude reset current pulses fully reset the filament path and the following low amplitude reset current pulses homogenize the filament path.

18 Claims, 13 Drawing Figures

METHOD AND MEANS FOR PREVENTING DEGRADATION OF THRESHOLD VOLTAGE OF FILAMENT-FORMING MEMORY SEMICONDUCTOR DEVICE

BACKGROUND OF THE INVENTION

The present invention relates to the storing of information in non-volatile memory switch devices like that disclosed in U.S. Pat. No. 3,271,541 granted Sept. 6, 1966 to S. R. Ovshinsky, and has its most important (but not its only) application in the storing of information in a memory array integrated onto a semiconductor substrate like that disclosed in U.S. Pat. No. 3,699,543 granted Oct. 17, 1972 to Ronald G. Neale. The memory switch devices for which the present invention is most useful preferably are formed of an amorphous semiconductor material comprising a tellurium based chalcogenide glass (amorphous) film which has the general formula:

$Ge_A Te_B X_C Y_D$ wherein:

A=5 to 60 atomic percent

B=30 to 95 atomic percent

C=0 to 10 atomic percent when X is Antimony (Sb) or Bismuth (Bi)

or

C=0 to 40 atomic percent when X is Arsenic (As)

D=0 to 10 atomic percent when Y is Sulphur (S)

or

D=0 to 20 atomic percent when Y is selenium (Se).

A preferred composition is:

$Ge_{14}Te_{72}Sb_2S_2$

The memory switch devices referred to are two-terminal bistable devices where the film of memory semiconductor material is capable of being switched from a stable high resistance condition into a stable low resistance condition when a square or sloping edged set voltage pulse of relatively long duration (e.g., ½–100 milliseconds or more) applied to spaced electrodes of this film at least initially exceeds what is referred to as the threshold voltage value. This value is based on a continuous DC or slowly rising voltage. (When a steep sided pulse having a very short duration measured in microseconds is applied thereto, the switching of the device to a low resistance condition requires a much higher switching voltage.) Such a set voltage pulse causes current to flow in a small filament (generally under 10 microns in diameter). The set current pulse generally heats the semiconductor material above its glass transition and crystallization temperatures where sufficient heat accumulates under the relatively long duration involved to cause, upon termination or slow gradual reduction of the set current pulse, a slow cooling of the material which crystallizes the material in the filament. Set current pulses are commonly of a value of from 0.5 milliamps to about 15 milliamps, although they are generally well under 10 milliamps for most memory switch applications. The magnitude of the set current pulse is determined by the open circuit amplitude of the set voltage pulse and the total series circuit resistance involved including the memory device. A crystallized low resistance filament remains indefinitely, even when the applied voltage and current are removed, until reset to its initial amorphous high resistance condition.

The set crystallized filament in the semiconductor materials previously described can generally be dissipated by the feeding of one or more reset current pulses of relatively short duration, such as current pulses of the order of magnitude of 10 microseconds. It was initially believed that to reset completely a crystalline filament set, for example, by a set current pulse of about 7 milliamps, required one or a few reset current pulses of the order of magnitude of 100 milliamps and greater, which was believed necessary to heat the entire filament of the semiconductor material to a temperature above the crystallization and melting tempertures of the material, where at least the crystalline filament is melted or otherwise reformed into the original amorphous mass. When such a reset current pulse is terminated, the material quickly cools and leaves a generally amorphous composition like the original one. Sometimes, it takes a number of reset current pulses to convert a previous set filament to what appears to be a fully reset state.

It was discovered that while the resistance and threshold voltage values of a reset filament region may indicate it has apparently been fully reset to its original amorphous composition (except for some non-resettable crystallites which ensure that subsequent crystalline filaments are formed in the same place), the reset filament region often is non-homogeneous, with the crystallizable elements like tellurium in various degrees of concentration. It was discovered that the amorphous regions containing higher than normal concentrations of the crystallizable element or elements could progressively crystallize at elevated temperatures within normal ambient temperature ranges (which commonly reach 70°C or higher). Such elevated temperatures are not uncommonly present in various applications of memory switches. Such progressive crystallization causes progressive degradation of the threshold voltage value of the semiconductor material. This problem has been partially overcome by feeding a number of additional reset current pulses through an apparently fully reset filament region, which homogenize the region (except for the few non-resettable crystallites referred to), as disclosed and claimed in application Ser. No. 409,135 filed Oct. 24, 1973 by Morrel H. Cohen now U.S. Pat. No. 3,846,767. While the Cohen invention was not limited to any particular number of reset current pulses of any particular value, an exemplary reset procedure disclosed utilized 8,150 milliamp reset current pulses spaced apart 100 microseconds.

As disclosed in said Neale patent, a memory array is formed within and on a semiconductor substrate, such as a silicon chip, which is doped to form spaced, parallel Y- or X-axis conductor-forming regions within the body separated by isolating regions of opposite conductivity type. The substrate is further doped to form an isolating device, such as a transistor or a diode, at each active crossover point defined by the point at which X- or Y-axis conductors deposited on the insulated surface of the substrate extend transversely of the doped Y- or X-axis conductors in the substrate. There are substrate terminals at each crossover point of the array initially exposed through openings in an outer insulating film on the substrate, and the memory array in its preferred form includes over each substrate terminal at each crossover point a deposited memory switch device including a thin film of amorphous memory semiconductor material (e.g. usually under 2 microns in thickness). Each film of memory semiconductor material is thus connected in series with the associated isolating device between the associated Y- or X-axis conductors.

The cost and compactness of such a memory array depends primarily on the number of isolating devices and deposited film memory devices per unit area incorporated in or on the substrate (referred to as the packing density thereof). The current carrying capabilities are greater for the deposited film memory switch devices than the doped diodes and transistors in the substrate, and the smaller the area occupied by the doped diodes and transistors formed in the silicon chip substrate the lower the current rating thereof.

In the exemplary embodiment of the invention disclosed in said application Ser. No. 409,135, typical reset current values in excess of 100 milliamps are disclosed. The apparent need for such high reset current pulses to reset and homogenize the memory semiconductor material of memory switch devices severly limits the practical applications of memory switch devices in memory arrays where cost and size restrictions require high packing densities having maximum current ratings of under 50 milliamps and sometimes under 10 milliampss. Thus, it becomes of great importance to be able to reliably reset a memory switch device used in such memory arrays with reset current pulses of under 50 milliamps, and preferably under 10 milliamps.

A breakthrough in the problem of reducing the magnitude of reset currents to low levels was achieved by the invention disclosed in U.S. application Ser. No. 410,412 filed Oct. 29, 1973 by Jan Helbers. Thus, Mr. Helbers discovered that the crystalline filament in a memory switch device of the type described could be dissipated by the use of a burst of a large number of reset current pulses each of an amplitude which was believed to be only a small fraction of the amplitude thought necessary to effect resetting of the entire filamentous path. The reset current pulses used in the practice of this resetting technique were generated by a constant current source which produced a variable voltage limited to a value below the threshold voltage value of the fully reset memory switch device having the lowest expected threshold voltage value, so as to stabilize the threshold voltage values of all the memory switch devices to which the current source was applied at identical or near identical values, despite the somewhat varying threshold voltage values of the various particular memory switch devices of the array. Since the threshold voltage valve of a filament being progressively reset gradually increases with the degree of reset achieved, when the threshold voltage value of the partially reset filament of the memory switch device being reset exceeds the maximum possible voltage output of the constant current reset source, purposefully set below the maximum possible value thereof, the memory switch device cannot be rendered conductive by any subsequently generated reset voltage pulses, and so no further reset action is possible. It is not then possible to effect homogenization of the filament region to prevent threshold degradation under elevated temperature conditions, since under this reset procedure the device is never fully reset and does not receive reset current pulses which homogenize a fully reset filament. Also, in such a voltage limited resetting technique when the maximum output of the constant current source is a voltage less than that of the minimum threshold voltage value of all memory devices to be reset, the spacing of the reset current pulses must be such as to permit the temperature of the partially reset filament to cool substantially to ambient temperature before the next reset current pulse appears, to permit the desired identity of threshold voltage values to be achieved.

Accordingly, one of the objects of the present invention is to develop a resetting technique for memory switch devices of the type described incorporated in low current rated circuits requiring progressive resetting of the memory switch devices and where homogenization of a fully reset filament is achieved.

A progressive resetting technique as described where each resetting operation automatically establishes an identical threshold voltage value independently of the actual threshold voltage value of the memory switch device when fully reset would seem to avoid any problem of threshold degradation where the device is not subjected to elevated ambient temperatures. However, most commercial applications of presently developed memory semiconductor materials operate or must be designed to operate under high ambient temperature conditions where homogenization is necessary making such a resetting technique of limited value. It has been unexpectedly discovered that the threshold voltage value of non-voltage limited reset memory switch devices progressively degrades when subjected to repeated set and reset procedures of the type carried out before my present invention. For example, where the thickness of a memory switch device-forming semiconductor film in a memory array provides a threshold voltage of, for example, 14 volts at room temperature when the array is initially fabricated and subjected to the usual testing where each memory switch device undergoes about 20 to 30 set-reset cycles, it was found that upon the subsequent application of thousands of additional set and reset cycles applied at the usual way, the threshold voltage value progressively decreases below 8 volts. It is believed that this threshold degradation is caused in a germanium-tellurium memory semiconductor composition by electromigration of tellurium during the flow of reset current, the degree of which degradation is believed to be directly related to the current density involved. Such electromigration of tellurium builds up a progressively greater thickness of crystalline tellurium next to one of the electrodes involved, which progressively reduces the threshold voltage value of the memory switch device until equilibrium is reached between the migration of tellurium atoms during the flow of reset current and diffusion thereof back into the general amorphous mass of the reset filament region after flow of reset current eases.

The aforesaid threshold degradation poses a serious problem when the read voltage exceeds the degraded threshold voltage value because then the read voltage will render conductive such a memory switch device to give erroneous storage information. If the read-out voltage reaches, for example, only 5 volts, at first glance it would not seem that a threshold degradation to 8 volts would be a serious problem. However, a memory switch device having a given initial threshold voltage at room ambient temperature will have a substantially lower initial threshold voltage at substantially higher ambient temperatures, so that, for example, a memory switch device having an 8 volt threshold voltage at room temperature can have a threshold voltage of 5 volts at ambient temperatures of 100°C. Threshold degradation can thus be especially serious for equipment to be operated, or having specifications ensuring reliable operation, at high ambient temperatures. (It should be noted also that threshold voltages will increase with decrease in ambient temperature so that a memory semiconductor film thickness is generally limited by the breakdown voltage limitations of the array.) In any event, it is apparent that it is important that the memory devices of the memory arrays referred to have a fairly stabilized threshold voltage for a given reference or room temperature, so that the reliability of the matrix can be assured over a very long useful life span under wide temperature ranges like 0°–100°C.

As disclosed and claimed in my co-pending application Ser. No. 396,497, filed Sept. 12, 1973, an apparent stabilization of the threshold voltage of a filament-type memory switch device was achieved after a relatively few number of set and reset cycles (where full resetting reset current pulses are utilized in the reset operation) if during the fabrication of these devices there is provided by at least one of the electrodes an electrode-semiconductor interface region with a substantial enrichment (i.e., high concentration) of the element which would otherwise migrate to the electrode during flow of reset current through the semiconductor material filament being reset. Thus, in the example of a germanium-tellurium memory semiconductor composition, a region of tellurium is provided of a much higher concentration than in the amorphous composition of the semiconductor material adjacent the positive electrode at least at the point where the crystalline tellurium filament path of the semiconductor material terminates. The initial enrichment with tellurium of the area next to the electrode involved reduces the number of set and reset cycles to achieve what was thought to be a stable equilibrium of electromigration and diffusion. While an advantageous initial threshold stabilization was achieved in a few set and reset cycles during fabrication of the relatively few memory switch devices tested referred to, (using 8–150 milliamp, 6 microsecond wide reset current pulse spaced 100 microseconds apart), it was subsequently discovered that the threshold voltage stabilization observed did not in fact continue indefinitely in most memory switch devices tested.

Accordingly, another object of the invention is to provide a unique resetting technique which eliminates or substantially reduces threshold degradation due to repeated set or resetting of memory switch devices.

SUMMARY OF THE INVENTION

I have made the unexpected discovery that threshold degradation under repeated set and resetting of a memory switch device as described can be substantially eliminated by utilizing a reset technique involving the feeding in succession of a number of partially or fully resetting current pulses by controlling primarily the spacing and secondarily the duration of the reset pulses used in each reset operation. Also, it was discovered that to prevent undesired threshold degradation, the number of reset pulses in each burst of reset pulses used to effect a resetting operation should be limited below a given maximum (although they must be of sufficient number to effect not only full resetting of the filament involved but also, where needed, homogenization of the fully reset filament). Where usually undesired high current reset pulses (e.g., 150 milliamps) are used the number of pulses should be kept well under 100. For low current reset pulses (e.g., 30 milliamps) the permissible maximum is proportionately increased.

Accordingly, for example, threshold degradation has been eliminated where each reset operation comprises a burst of reset current pulses at least in the neighborhood of about 10 pulses (but preferably from 40–60 pulses for high current reset or 75–150 pulses for low current reset. Each pulse is substantially under 10 microseconds (e.g., 1 microsecond) in duration and the pulses in each burst are spaced apart substantially under 10 microseconds (e.g., 5 microseconds), which is less than two and preferably of the order of one thermal time constant or less of the device, so that the filament region involved does not substantially completely cool to ambient temperature between reset pulses, but rather reaches a temperature intermediate the reset and ambient temperatures. When the spacing of the pulses becomes too narrow, substantially too little cooling takes place between pulses, and successive pulses tend to act like a single pulse of a total duration of the period occupied by the burst of reset pulses, which effect a setting rather than a resetting operation.

The presence of threshold degradation with a burst of reset current pulses of the desired width and spacing but of a very large number is, indeed puzzling. Similarly, the presence of threshold degradation when utilizing a more limited number of properly spaced pulses for pulse widths in the order of magnitude of 10 microseconds or greater is also puzzling. The importance of close spacing of the reset pulses in each burst of reset pulses is, however, explainable on the theory that threshold degradation is due to an imbalance between electromigration of tellurium during flow of reset current and diffusion thereof in the other direction between reset pulses. For reset current pulses spaced apart less than the thermal time constant of the amorphous semiconductor film involved, the filament region is still hot when the next reset pulse arrives. Consequently, an area of higher conductivity exists which results in a lower maximum current density and reduced electromigration. With such reduced electromigration, the diffusion which exists after termination of each reset pulse balances out the amount of electromigration during the flow of reset current.

In accordance with another aspect of the present invention, discovery of the importance of pulse width and spacing is applied to the low current progressive resetting of crystalline filaments of memory switch devices of the type described in a manner which provides homogenization after full reset thereof to prevent threshold degradation when the memory switch device is switched to high ambient temperature. To this end, progressive resetting with small reset current pulses may be achieved using a constant current reset source producing for each reset operation a burst of a large number of reset current pulses spaced apart of the order of about a thermal time constant of the memory semiconductor material being reset and having its maximum input voltage set at a level in excess of the highest switching voltage of all the memory switch devices to be reset. For example, a burst of low current reset current pulses (e.g., 100–27.5milliamp pulses) having the profiles above-described fed to the memory switch devices involved will insure full homogenization of the memory semiconductor material thereof and a stabilized threshold value under both high temperature conditions and repeated set and reset thereof.

DESCRIPTION OF THE PREFERRED EMBODIMENT OF THE INVENTION

Figures 1, 2, 3:
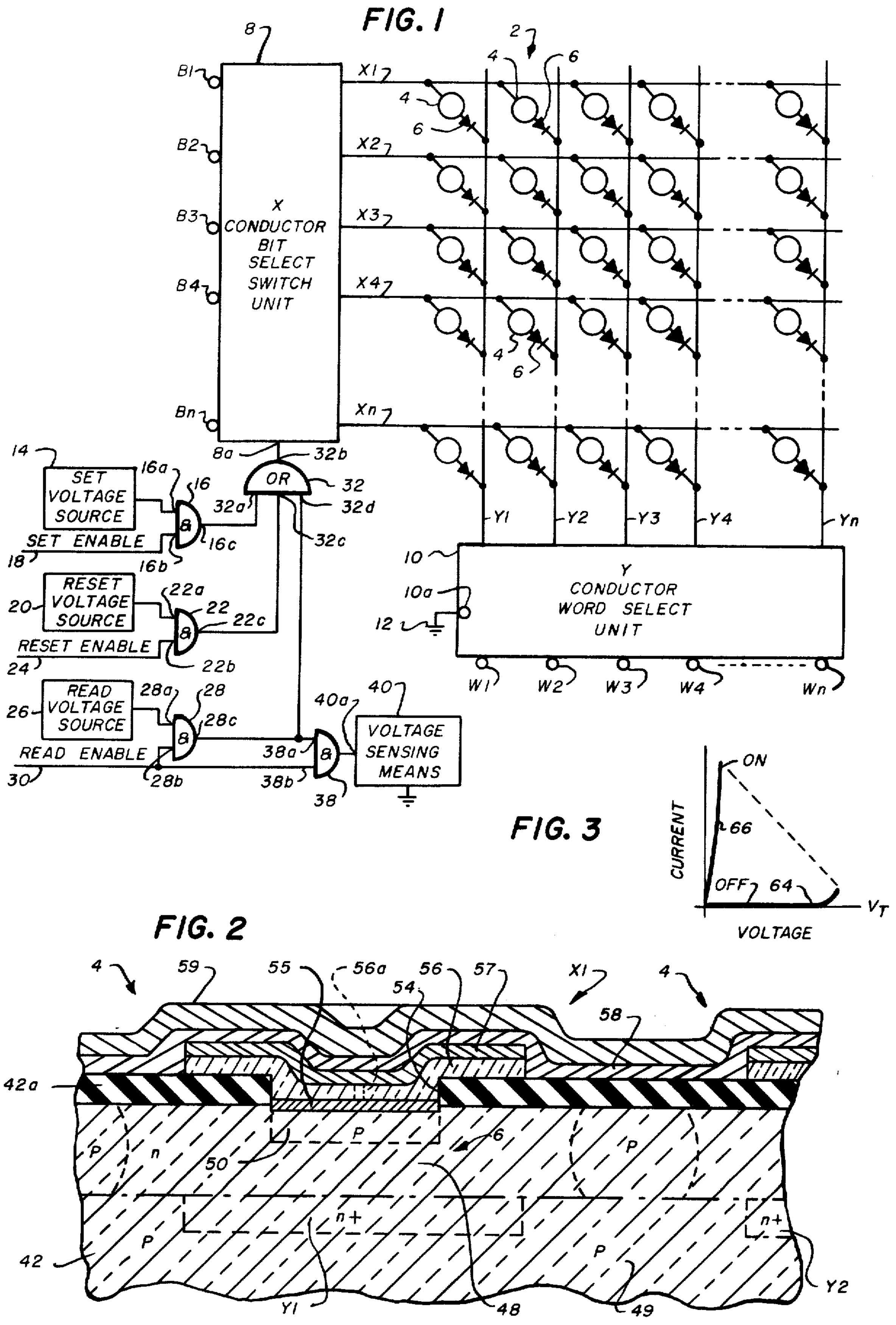
FIG. 1 is a schematic diagram, partly in block form, showing a memory array having a memory switch device and an isolating device at each crossover point thereof, and set, reset and read voltage sources and switching means for selectively feeding one of the voltage sources to the array for writing information into, reading information from or resetting the memory array.
FIG. 2 is an enlarged sectional view through a memory switch and isolating device at a crossover point in a preferred form of memory array for which the present invention has one of its most important applications.
FIG. 3 is a curve showing the voltage-current characteristics of the memory switch devices of the array of FIG. 1.

Referring now more particularly to FIG. 1, a schematic diagram of a memory array is generally identified by reference numeral 2 and includes a group of parallel X-axis conductors X1, X2 . . . Xn and a group of parallel Y-axis conductors Y1, Y2 . . . Yn extending transversely of the X-axis conductors to form rows and columns of crossover points. Between each crossover point represented by one of the X-axis conductors and one of the Y-axis conductors is connected a memory switch device 4 of the general type previously described and an isolating device 6 which is most advantageously a p-n junction or diode. In the most important application of the invention, one of the groups of conductors referred to, such as the Y axis conductors, and the isolating p-n junctions or diodes 6 are integrated into a semiconductor substrate, which may be a silicon chip, using more or less conventional doping techniques. The Y-axis conductors and the memory switch devices 4 are most preferably formed as deposited films on top of the substrate in a manner to be more fully described hereinafter and shown in FIG. 2.

While there are different ways in which various voltage sources can be connected to the X- and Y-axis conductors to effect writing (or setting), resetting and read operations in the exemplary form of the invention being described, this is accomplished with the aid of a more or less conventional X-conductor bit selection switch unit 8 and a Y-conductor word selection switch unit 10. The X conductor bit selection switch unit 8 has a number of binary code input terminals B1, B2 . . . Bn and the Y conductor word selection switch unit 10 has a number of binary code input terminals, W1, W2 . . . Wn. For each useful combination of binary coded signals appearing on the binary code input terminals B1, B2 . . . Bn, an input terminals 8a of the switch unit 8 is connected to a different designated X-axis conductor. Similarly, the Y-conductor word selection switch unit 10 connects an input terminal 10a thereof to a selected Y-axis conductor depending upon the combination of binary coded signals fed to the input terminals W1, W2 . . . Wn thereof. Reference ground 12 is shown connected to input terminal 10a of the Y-conductor word selection switch unit 10, so the selected Y-axis conductor is grounded. Set, reset and read current sources 14, 20 and 26 are connected through an associated "and" and "or" gate units to the input terminal 8a of the switch unit 8 during a set, reset or read operation.

In the particular memory array circuit illustrated in FIG. 1, the set current source 14 is connected to one of the inputs 16a of an "and" gate 16 whose other input 16b is connected to a set enable line 18 on which a signal pulse appears when it is desired to write information into a selected memory switch device 4 at a particular selected crossover point of the memory array 2. The "and" gate 16 has its output 16c connected to the input 32a of an "or" gate 32 whose output 32b is connected to the aforementioned input terminal 8a of the X conductor bit switch unit 8. Similarly, reset current source 20 is connected to one of the inputs 22a of an "and" gate 22 whose other input 22b is connected to a reset enable line 24 which receives a pulse where it is desired to reset a selected memory switch device at a particular crossover point of the memory array 2. The output 22c of the "and" gate 22 is connected to an input 32c of the "or" gate 32.

Read current source 26 is connected to one of the inputs 28a of an "and" gate 28 whose other input 28b is connected to a read enable line 30 which receives a pulse when it is desired to read information from the memory array 2. The output 28c of the "and" gate 28 is connected to an input 32d of the "or" gate 32. The input 40a of a voltage sensing circuit 40 is connected to the output of an "and" gate 38 having an input 38a connected to the output of the "and" gate 28 associated with the read current source 26. The other input 38b of the "and" gate 38 is connected to the read enable line 30 so that the voltage sensing circuit 40 will sense the output of the read current source 26 when the read enable line 30 is pulsed.

It should thus be apparent that depending upon which of the enable lines 18, 24 or 30 an enable pulse appears, one of the outputs of the pulse sources 14, 20 or 26 will appear at the input terminal 8a of the X-conductor bit selection switch unit 8 during the enable pulse involved. Each current source 14, 20 and 26 and the associated "and" gate and enable input constitutes a current pulse source.

Figure 4:
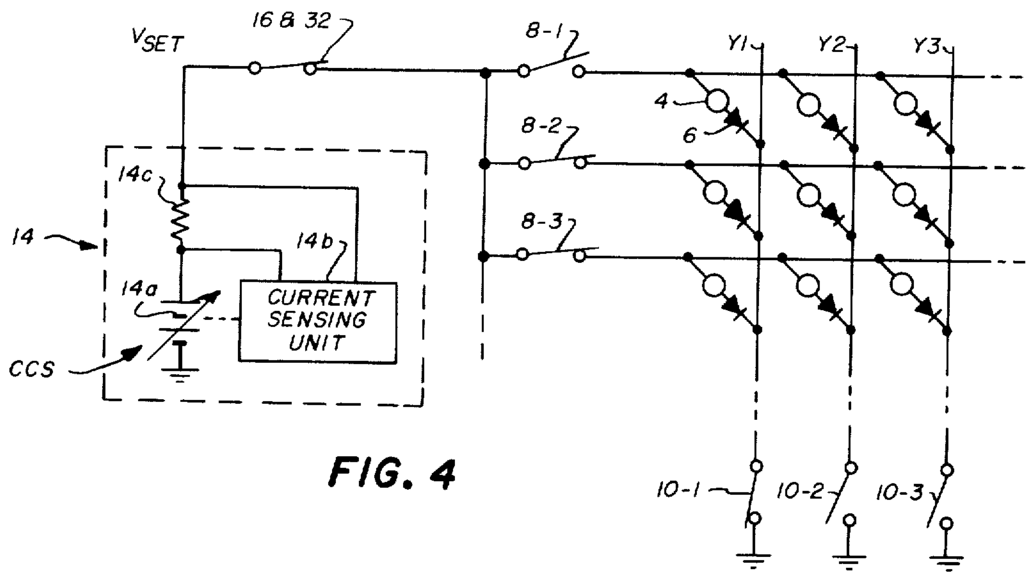
FIG. 4 shows a simplified diagram of the circuitry present during the setting of one of the memory switch devices of the memory array of FIGS. 1 and 2 into a low resistance condition.
Figure 5:
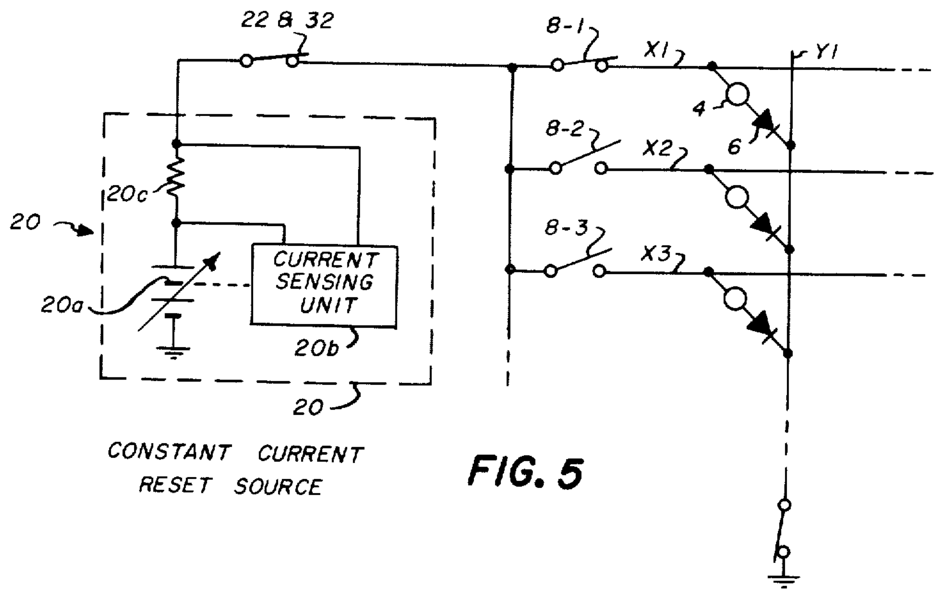
FIG. 5 shows a simplified diagram of the circuitry present during the resetting of one of the memory switch devices of the memory array of FIGS. 1 and 2 into a high resistance condition.
Figure 6:
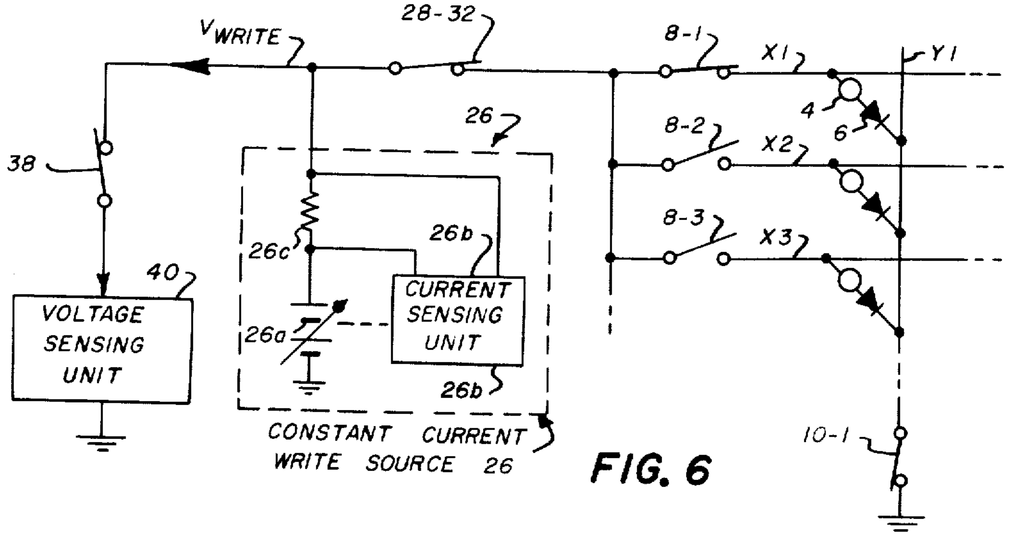
FIG. 6 shows a simplified diagram of the circuitry present during the reading of information from a selected crossover point of the memory array of FIG. 1.

FIGS. 4, 5 and 6 respectively show the equivalent circuit of the active and some inactive portions of the memory array during the set, reset and read operations performed on the memory array 2. The set, reset and read current sources 14, 20 and 26 each may be a conventional constant current source which automatically adjusts its output voltage to deliver a fixed amplitude current pulse up to a given voltage limit. (Such a constant current source may include an adjustable DC voltage source 14a, 20a or 26a adjusted by a current sensing means 14b, 20b or 26b sensing current flow by detecting the voltage drop across a resistor 14c, 20c or 26c.)

FIG. 2 shows completely one of the memory switch devices 4 integrated upon a silicon chip substrate generally indicated by reference numeral 42. One of the Y-axis conductors Y1 is indicated by an n-plus region in the substrate 42 which region is immediately beneath an n-region 48, in turn, immediately beneath is p-region 50. The p-n regions 50 and 48 of the silicon chip 42 form the diode 6 at the crossover point involved, and together with the memory switch device 4 are connected in series between the associated X- and Y-axis conductors. Part of a memory switch device 4 and the associated n-plus region forming the adjacent Y-axis conductor Y2 is shown in FIG. 2. A p-region 49 isolates each adjacent pair of n-plus Y-axis conductors like Y1 and Y2.

The said silicon chip 42 has a film 42a of an insulating material, such as silicon dioxide. This silicon dioxide film is provided with openings like 54 each of which initially exposes the semiconductor material of the silicon chip above which point a memory switch device 4 is to be located. A suitable electrode layer 55 is selectively deposited over each exposed portion of the silicon chip, which layer may be palladium silicide or other suitable electrode-forming material. Each memory switch device 4 is formed by a layer of amorphous semi-conductor material 56 preferably sputter deposited over the entire insulating film 42a and then etched away through a photo-resist mask to leave separated areas thereof centered over the openings 54 in the insulating film 42a where the memory semiconductor film extends into an opening 54. The memory semiconductor layer 56, as previously indicated, is most preferably a chalcogenide material having as major elements thereof tellurium and germanium, although the actual composition of the memory semiconductor material useful for the memory semiconductor layer 56 can vary widely in accordance with the broader aspects of the invention.

Although not absolutely necessary for such purpose, threshold stabilization is aided by forming in the interface region between a refractory metal barrier-forming electrode layer 58 like molybdenum and the memory semiconductor layer 56 an enriched region of the element which would normally migrate towards the adjacent electrode, namely in the tellurium-germanium composition involved an enriched area of tellurium. (The barrier-forming electrode layer 58 prevents migration of metal ions from the highly conductive electrode layer 59 of aluminum or the like into the memory semiconductor layer 56.) By an enriched region of tellurium is meant tellurium in much greater concentration than such tellurium is found in the semiconductor composition involved. This can be best achieved by sputter depositing a layer 57 of crystalline tellurium upon the entire outer surface of the memory semiconductor layer 56. The tellurium layer 57 most advantageously extends opposite substantially the entire outer surface area of the memory semiconductor layer 56 and the inner surface area of the barrier-forming refractory metal layer 58, so the tellurium region will be located at the termination of a filamentous current path 56a in the memory semiconductor layer 56 no matter where it is formed, and so it makes an extensive low resistance contact with the refractory metal layer 58. The tellurium layer 57 thus lowers the overall resistance of the memory switch device 4 in the conductive state thereof. Over the inner barrier-forming refractory metal layer 58 is the outer highly conductive metal electrode layer 59 of aluminum or the like which, as illustrated, is an integral part of a band of conductive material like aluminum deposited on the refractory metal layer and forming one of the X-axis conductors. With the application of a tellurium layer 57 of sufficient thickness (a 0.7 micron thickness layer of such tellurium was satisfactory in one exemplary embodiment of the invention where the memory semiconductor layer 16 was at least 1.5 microns), the threshold voltage of the memory switch device 4 stabilized after degrading from an initial value after about 10–20 set-reset cycles. However, as will appear, this apparently stabilized threshold voltage could still be progressively further degraded after many thousands of set-reset cycles if further reset operations were not carried out in accordance with the present invention.

Figure 7A:
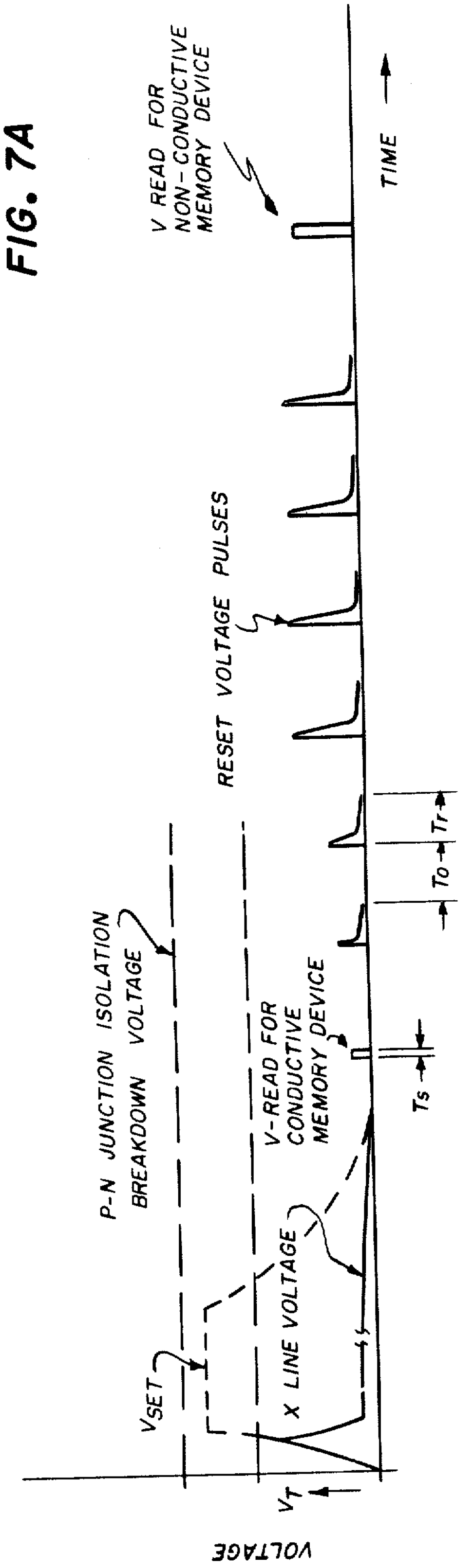
FIGS. 7A and 7B show exemplary voltage and current pulse waveforms present in the memory array circuit of FIG. 1 during writing information into, reading information from and resetting the memory array of FIG. 1.
Figure 7B:
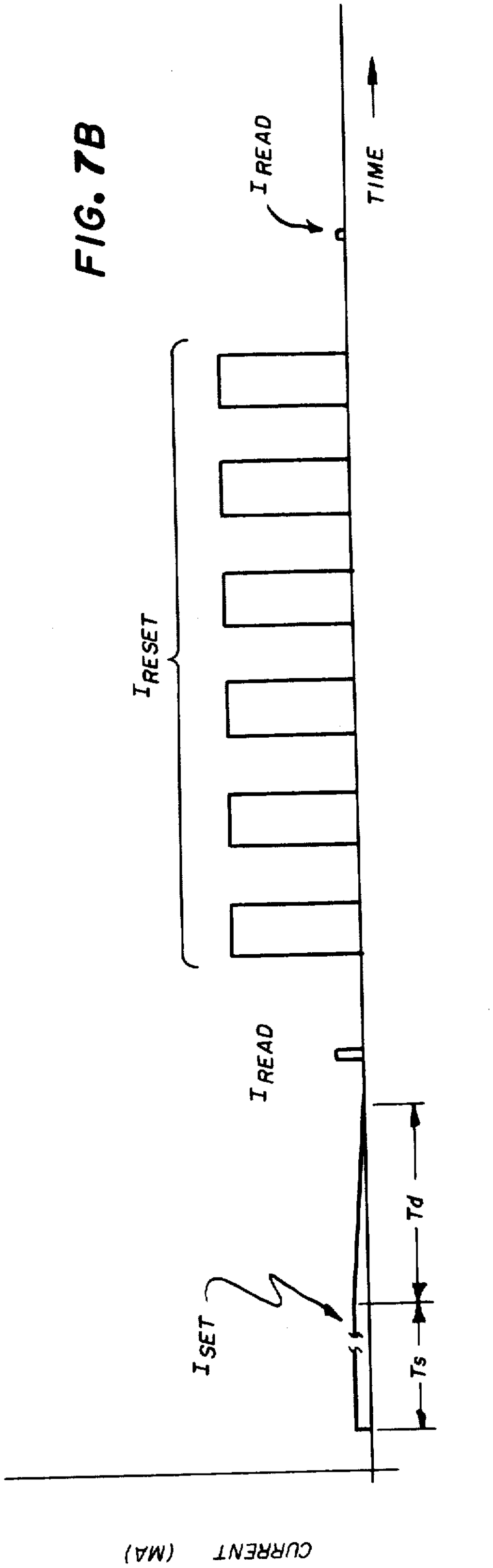

Exemplary outputs of the set, reset and read current sources 14, 20 and 26 are illustrated in FIG. 7A and the exemplary currents produced thereby are illustrated in FIG. 7B below the corresponding voltage pulses involved. As there shown, the voltage output of the set pulse source 14 will be in excess of what is referred to as the DC threshold voltage value (VT) of the fully reset memory switch device 4 of the array having the largest threshold voltage value and below the breakdown voltage of the isolating diodes 6 or Y-axis conductor isolating regions 49 of the silicon chip substrate 42. For a set voltage pulse to be most effective in setting a memory switch device 4 from an initial high resistance to a low resistance condition, a generally long duration pulse waveform is required having a duration in milliseconds as previously described. However, the reset pulse output of the reset pulse source 20 is a very short duration pulse measured in microseconds rather than milliseconds. (It is assumed that the high resistance condition of a memory device is so much higher than any impedance in series therewith that one can assume that substantially the entire applied voltage appears thereacross until it is switched to a lower resistance condition where the voltage thereacross drops to a very low fairly constant value.)

In the initial amorphous or reset state of a memory switch device 4, the memory semiconductor layer 56 thereof is mostly an amorphous material throughout, and acts substantially as an insulator so that the memory device is in a very high resistance condition. However, when a set voltage pulse is applied across its electrodes which exceeds the switching or what will be referred to as the DC threshold voltage value of the memory switch device, current starts to flow in a filamentous path 56*a* (FIG. 2) in the amorphous semiconductor layer 56 thereof, which path is heated above its glass transition temperature. The filamentous path 56*a* is generally under 10 microns in diameter, the exact diameter thereof depending upon the value of the current flow involved. The current resulting from the application of the set voltage pulse source is generally under 10 milliamps. Upon termination of the set voltage pulse, because of what is believed to be the bulk heating of the filamentous path 56a and the surrounding material due to the relatively long duration current pulse and the nature of the crystallizable amorphous composition of the layer 56, such as the germanium-tellurium compositions described, one or more of the composition elements, mainly tellurium in the exemplary composition previously described, crystallizes in the filamentous path. This crystallized material provides a low resistance current path so that it takes only a relatively small voltage output of a read pulse source 26 to feed a reference current through the filamentous path 56a of a set memory switch device 4.

FIG. 3 shows curves 64 and 66 of the variation in current flow through a memory switch device 4 with the variation in applied voltage when the memory switch device is respectively in its relatively high resistance reset condition and in its relatively low resistance set condition. When the isolating device 6 is a diode, a voltage applied in the blocking direction of the diode does not cause any significant current flow in the memory switch device up to the breakdown voltage thereof. (The memory switch device is otherwise a bidirectional device).

A read operation performed on the array shown involves the interrogation of a selected crossover point of the memory array accomplished by the feeding of the output of the read current source 26 to a selected X-axis conductor while the associated selected Y-axis conductor is grounded, so that the output of the read current source 26 appears between the selected X- and Y-axis conductor for a period which is preferably of an extremely short duration which is a small fraction of the turn-on delay period of a memory switch device. One way of sensing whether or not an interrogated memory switch device at a particular crossover point is in its high or low resistance condition is to detect by means of the aforesaid voltage sensing circuit 40 the magnitude of the output voltage of the read current source 26 during the feeding of a read current pulse to a selected crossover point of the memory array. This voltage magnitude is relatively high when the read current source 26 is trying to feed a constant current through a reset memory switch device and is relatively low when it is feeding current through a set low resistance memory switch device. It is important that the maximum output of the read current source 26 be less than the switching voltage of the device involved, since if a read pulse would cause conduction of the memory switch device involved even though it is not thereby permanently reset into a low resistance condition, it would be difficult to detect the difference between a set and reset memory switch device since the voltage necessary to feed a constant current through a conducting, though not permanently set, memory switch device is of the similar order of magnitude to the voltage necessary to feed the same current through a completely permanently set memory switch device.

It should be understood that other ways of detecting the high or low resistance condition of the memory switch device at a crossover point can be utilized. Thus, if the isolating diode 6 were to be formed by the emitter to base junction of a transistor integrated into the silicon chip substrate 42, the high or low resistance condition of a set or reset memory switch device is detected by the presence or absence of significant collector current in the transistor.

As previously indicated, the present invention is predicted on the discovery that the accordance of threshold voltage degradation of memory switch devices as described subjected to high ambient temperature conditions and repeated set and reset cycles can be achieved by a resetting procedure which utilizes a burst of unusually closely spaced current pulses passing through the filament to be reset which pulses will both fully reset the filament and homogenize the same. The intervals, between the reset current pulses is made sufficiently short that the temperature of the filament cools only partly to ambient temperature so it remains relatively hot between reset pulses. While the magnitude of each of these reset current pulses is desirable very low in the case the memory switch devices integrated into a silicon chip as shown in FIG. 2, where low current reset is not an important factor each reset current pulse can be of a relatively larger magnitude which can by itself substantially fully reset the filament to a high resistance condition. In such case, a number of reset current pulses is still needed to homogenize the filament in accordance with the teachings of copending application Ser. No. 409,135 filed Oct. 24, 1973 by Morrel Cohen, where, as in the case with memory semiconductor materials now in use, the material crystallizes under not uncommon high ambient temperature conditions.

Figure 8:
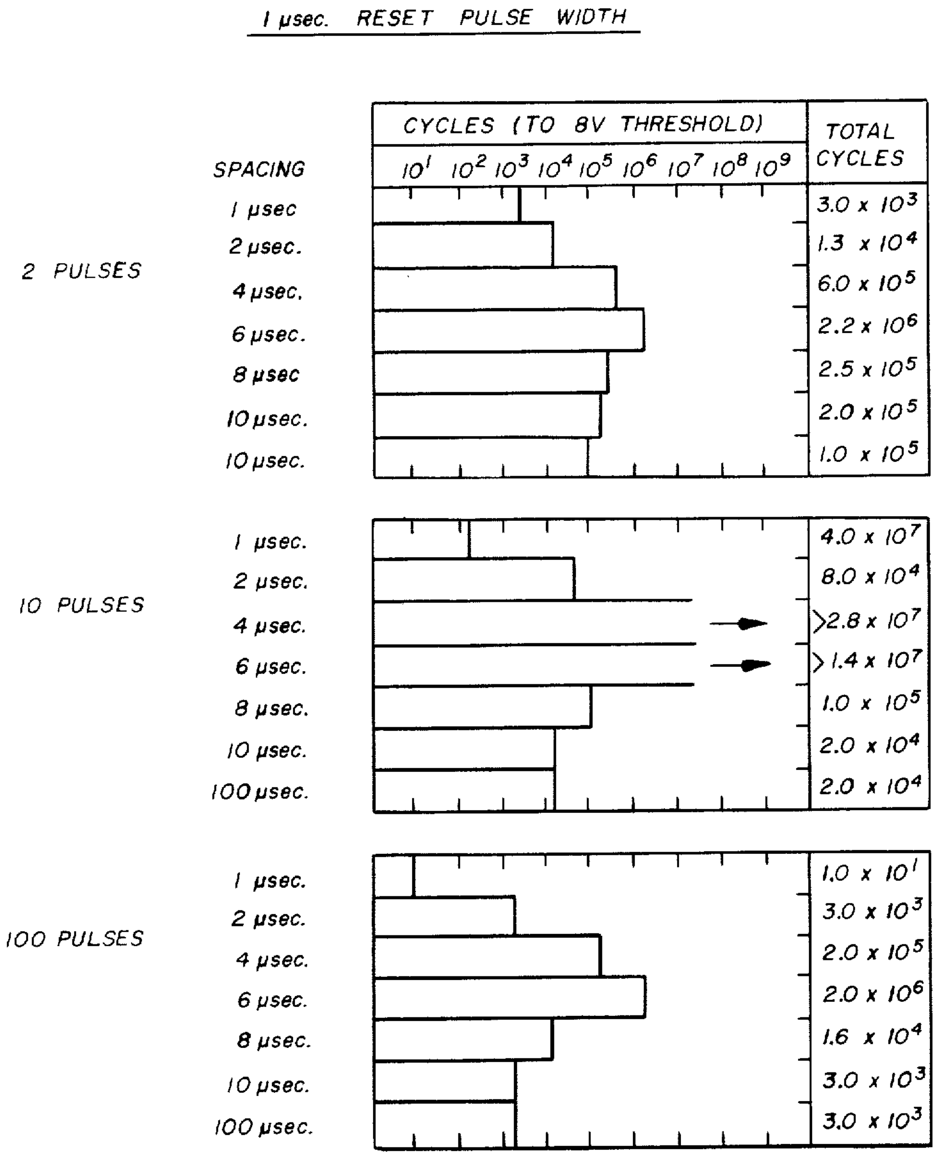
FIG. 8 is a chart illustrating the number of set and reset cycles applied to a memory switch device similar to that shown in FIG. 2 needed to progressively degrade the threshold voltage value thereof from the initial value of 14 to 8 volts when each reset operation is effected by a burst of reset current pulses of 1 microsecond duration and of varying number and spacing.
Figure 9:
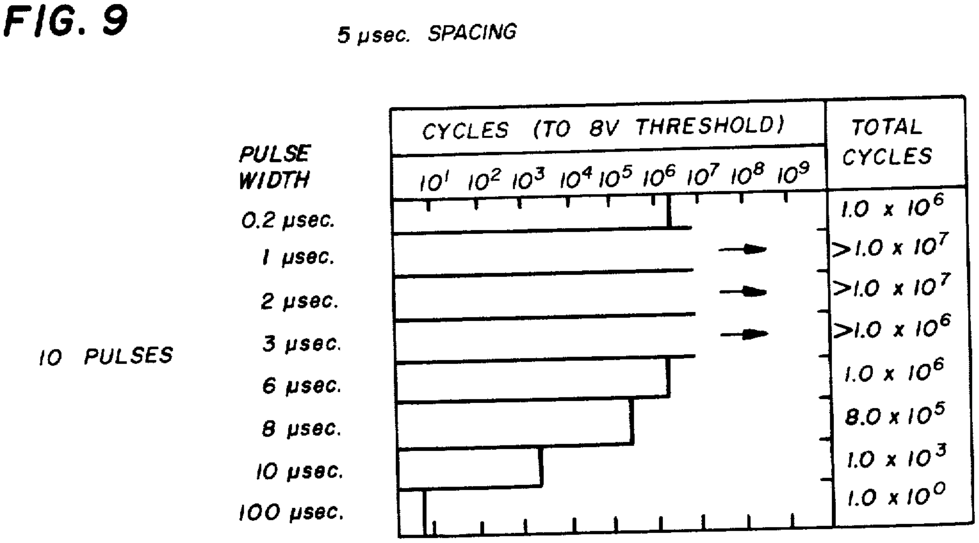
FIG. 9 is a chart illustrating the number of set and reset cycles applied to a memory switch device similar to that shown in FIG. 2 needed to progressively degrade the threshold voltage value thereof from the initial value of 14 volts to 8 volts when each reset operation is effected by a burst of 10 reset pulses spaced apart 5 microseconds and wherein the pulse width is varied progressively.
Figure 10:
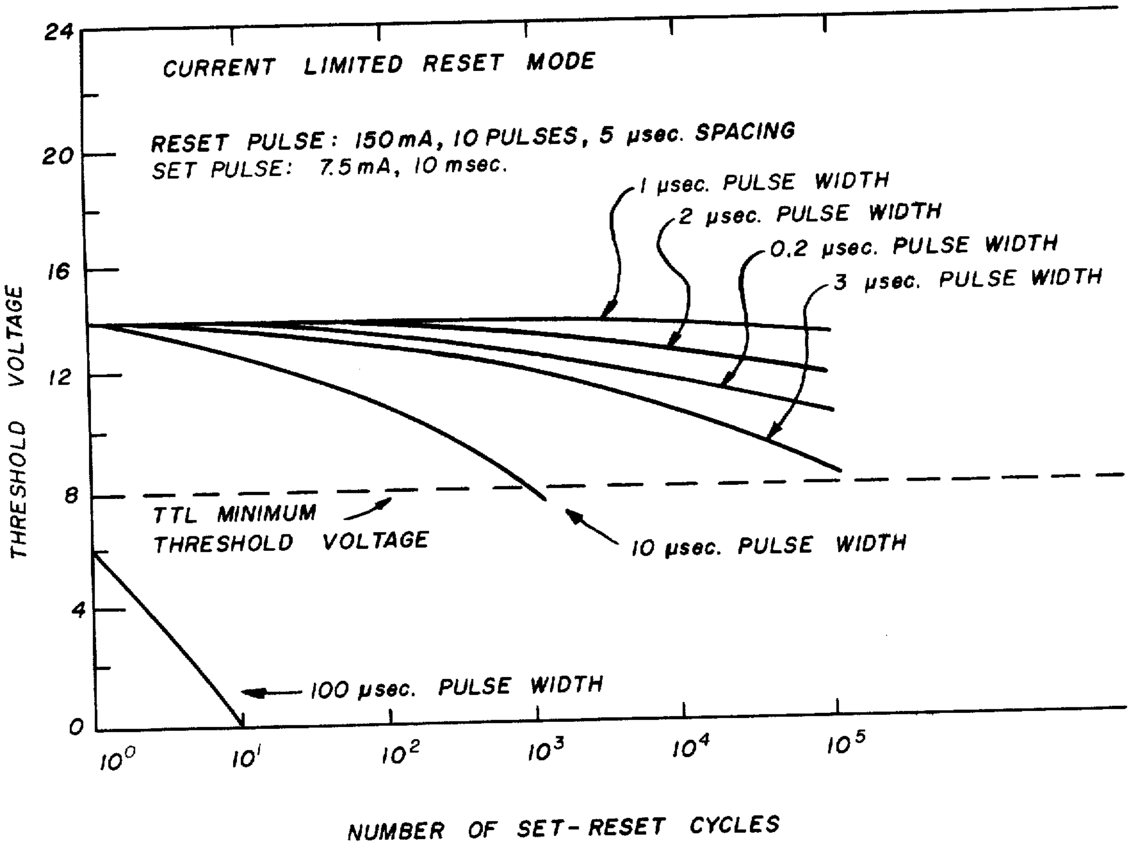
FIG. 10 is curves showing the change in the threshold voltage value of a memory switch device similar to that shown in FIG. 2 with the number of set and reset cycles and for varying width reset pulses where the reset operation is effected by a burst of 10 reset current pulses spaced 5 microseconds apart.

To provide evidence of the importance of the number, width and spacing of the reset pulses in each burst of reset pulses to effect a resetting operation, reference should now be made to the charts and curves in FIGS. 8–10. FIGS. 8–10 illustrate the degree of threshold voltage degradation, if any, for a memory switch device similar to that shown in FIG. 2 when repeatedly set and reset with set current pulses of 7.5 milliamps and reset current pulses of 150 milliamps with variation in pulse width, spacing and pulse number in each burst of reset current pulses. The memory switch devices tested utilized a film of amorphous semi-conductor material of approximately 1.5 microns in thickness which provided a threshold voltage of about 14–15 volts at room temperature. A threshold degradation to 8 volts at room ambient temperature has been generally considered to be unsatisfactory for reasons previously explained, and FIGS. 8 and 9 show the number of set and reset cycles for each reset current pulse profile indicated applied the memory switch devices tested and the point, if any, at which the threshold voltage degrades to 8 volts.

FIG. 8 shows that where each reset operation uses bursts of 1 microsecond width reset current pulses, no apparent threshold stabilization is achieved for bursts of 2 or 100 pulses. In the case where only 2 reset current pulses were utilized in each burst of reset pulses, it is believed that stabilization was not achieved since two pulses do not adequately completely reset the filament involved. However, where there were 10 pulses in each burst of reset current pulses, apparent threshold stabilization is achieved where the reset current pulse spacing varied from 4 to 6 microseconds. It is theorized that where the reset current pulses are spaced apart as closely as 1–2 microseconds, the reset current pulses cannot properly effect a resetting action since the material does not have a chance to cool much and successive reset current pulses act as one overall pulse of a duration equal to the time spanned by the pulses in the burst of pulses involved. In such case, bulk heating effects occur as in the case where the material is set, and the resetting action is either ineffective or only partially effective. On the other hand, when the spacing between the pulses exceeds, in the example shown, 4–6 microseconds, there is a relative balance between electromigration effects during reset current flow and reverse diffusion effects between the reset current pulses.

In FIG. 9, the ideal 5 microsecond spacing and the satisfactory 10 pulses per burst found to be satisfactory in FIG. 8 are utilized in the tests where the variable is the reset current pulse width utilized. FIG. 9 illustrates that threshold stabilization is achieved for reset current pulse widths of from 1–3 microseconds. It is not known definitely why pulses much in excess of 3 microseconds, such as 6 microseconds and greater, produce incomplete threshold stabilization even though these durations are an infinitesimal portion of the duration of a normal set pulse which extends several milliseconds.

FIG. 10 illustrates the progressive degradation of the threshold voltage as the width of the pulse varies. The 1 microsecond width pulses produce almost perfect threshold voltage stabilization. The reason why the 0.2 width current reset pulse produces inadequate threshold stabilization can be explained on the basis that with such a narrow reset current pulse 10 pulses in the burst of reset pulses is an inadequate number to effect complete resetting of the filament involved.

The principles derived from the tests shown in FIGS. 8–10 also hold for a resetting operation wherein each of the reset pulses is only a fraction of the 150 milliamp pulses utilized. However, the exact point at which complete threshold stabilization is achieved can vary somewhat depending upon the amplitude of the set and reset current pulses, the thicknesses of the semiconductor film involved and other variables. In any event, the spacing of the reset current pulses must be such that the pulses are sufficiently spaced apart that successive pulses do not have an accumulating effect of a continuous pulse occupying substantially the same duration as the reset current pulses involved and are sufficiently closely spaced together that their spacing is preferably less than the thermal time constant of the amorphous semiconductor film involved so the filament being reset remains heated although partially cooled between successive reset current pulses.

The instantaneous temporary threshold voltage of a memory switch device as described decreases with the increase in temperature of the filament following termination of each reset current pulse. Thus, instantaneously after termination of a reset current pulse, which is believed to heat the filament to a temperature in excess of both the crystallization and melting temperatures of the semiconductor material, the temperature of the reset region gradually decreases over a number of thermal time constants, and as this temperature decreases the instantaneous temporary threshold voltage value of the device progressively increases from a minimum value until it reaches a stabilized value. If a second reset voltage pulse occurs before the instantaneous threshold voltage value reaches its stabilized value, the semiconductor film can be switched into its conductive state by a voltage less than the stabilized threshold voltage value. The period of time it takes the threshold voltage value to completely return to its stabilized value is referred to as the threshold recovery period of the device. Thus, another way of defining the spacing between the pulses in each burst of reset pulses is that it is substantially less than the threshold recovery period of the memory switch devices (substantially less meaning in most cases no greater than about one-half such recovery period) in one application of the present invention. Referring to FIGS. 7A and 7B, the following parameters for the set and reset current and voltage profiles were utilized for the memory switch devices of a memory array constructed like that shown in FIG. 2:

| | |
|---|---|
| I set - 3.5 milliamps | I reset - 27.5 milliamps |
| VT - 15 volts | Tr - .5 microseconds |
| Ts - 2 milliseconds | To - 3.5 microseconds |
| Td - 2 milliseconds | No. of reset pulses in each burst - 100 |

Under the above conditions, the most reliable operation of the device is achieved when the read current pulses do not exceed 1.5 milliamps. Each 27.5 milliamp reset current pulse in each burst of reset current pulses only partially resets the filament.

Similar effective resetting of the memory switch device can be obtained in a memory array having much lower current capabilities than 27.5 milliamps referred to as, for example, where each reset current pulse has a magnitude substantially under 10 milliamps, such as 5 milliamps. Thus, another reset current pulse profile useful in memory arrays formed in and on a silicon chip substrate having a 5 milliamps current limit is one where each burst of reset pulse comprises 500–4 milliamp reset current pulses spaced apart 5 microseconds and each of a duration of 1.0 microseconds to fully reset and homogenize a 1.5 micron thick memory semiconductor film which was previously set by a 2 milliamp set current pulse having a 5 millisecond flat top and a 5 millisecond gradually diminishing trailing edge.

Figures 11A, 11B, 11C:
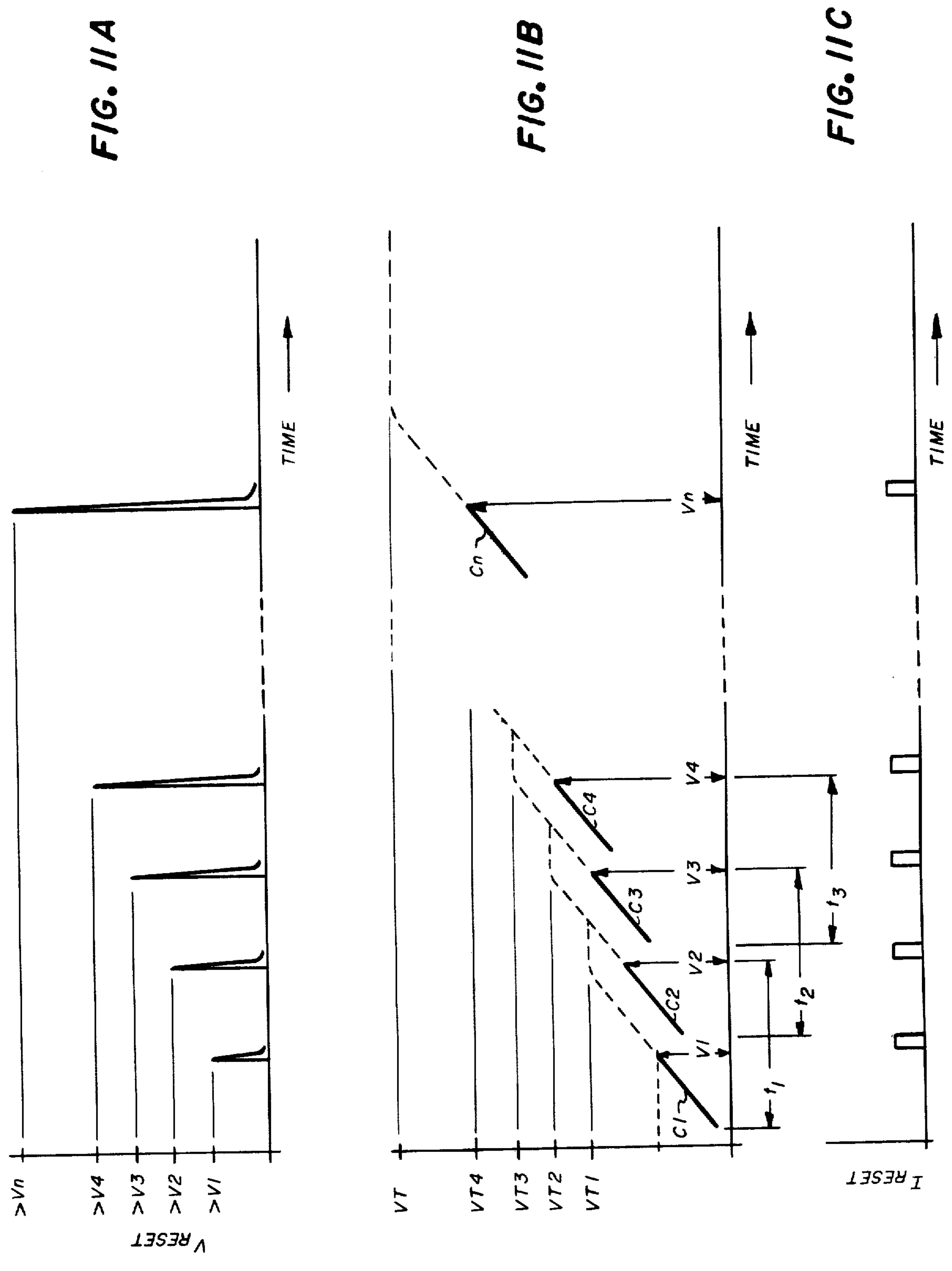
FIG. 11A shows the waveform of the output of the reset current pulse source operable in resetting a selected memory switch device of the memory array of FIG. 1.
FIG. 11B illustrates the variation of the threshold voltage values of the memory switch device being progressively reset by successive reset voltage pulses shown in FIG. 8A.
FIG. 11C shows the reset current pulses which flow as a result of the reset voltage pulses of FIG. 8A.

Reference should be made to FIGS. 11A, 11B and 11C which illustrate the variation in the instantaneous temporary threshold voltage value of a memory switch device progressively partially reset by a succession of reset current pulses spaced apart substantially less than the recovery delay period thereof. as explained. The solid and dashed portions of the curves C1, C2, C3, etc., in FIG. 11B illustrate the progressive increase in the temporary threshold voltage values of the memory switch device on successive application of small reset current pulses which only partially reset an initially crystalline filament.

Since each successive reset voltage pulse will cause additional progressive partial resetting of the memory switch device, the stable threshold voltage value of the device and the temporary threshold voltage values at which each reset voltage pulse switches the memory switch device progressively rises to levels VT1, VT2, VT3, etc., and V1, V2, V3, etc., reaching a maximum temporary and stabilization values **V*n* and VT**. When the successive reset pulses are spaced apart only a fraction of the recovery periods ($t1$, $t2$, $t3$, etc.), such stable threshold voltage levels are established by reset voltage pulses which are only a fraction of these stable threshold voltage values, namely at magnitudes V1, V2, V3, etc. By feeding a large number of additional low amplitude current reset pulses beyond that necessary to fully reset the device to a maximum possible threshold voltage value in the manner permitted by the low amplitude current pulse reset procedure shown in FIGS. 11—11, the apparently fully reset filamentous path of the switch device is homogenized to avoid threshold degradation when the switch device is operated or stored at above room temperature conditions, as explained in said copending application Ser. No. 409,135 of Morrel H. Cohen.

In summary, the present invention provides substantial threshold stabilization at both high temperature ambient conditions as well as under repeated set and reset cycles significantly to improve the reliability of memory switch devices. Moreover, the recognition that this reliable resetting can be achieved with very low currents is a further important development in the integration of memory switch devices into semiconductor substrates under conditions where homogenization of the filaments can be achieved.

It should be understood that numerous modifications may be made in the most preferred examples of the invention described without deviating from the broader aspects thereof.

I claim:

1. A method of resetting a filament-type memory device including spaced electrodes between which extend a body of generally amorphous non-conductive memory semiconductor material which, when a set voltage pulse in excess of a threshold voltage value and duration is applied to said electrodes has formed therein a crystalline low resistance filament resettable into a generally amorphous condition by application of one or more reset voltage pulses producing reset current pulses through said filament which heat the same to a temperature which dissipates substantially the entire crystalline filament and are of a duration which is so short that upon termination thereof the filament will be quickly quenched to leave at least portions of the filament in a substantially amorphous condition, said memory semiconductor material being such that immediately after each reset current pulse flows through the previously set filamentous path the threshold voltage value thereof drops to a minimum temporary threshold voltage value and gradually rises to a stabilized threshold voltage value over a recovery period, said method comprising: applying to said electrodes a burst of reset voltage pulses spaced apart a fractional part of said recovery period and each of a value in excess of the temporary threshold voltage value, so reset current pulses are produced thereby each of which at least partially converts the crystalline filamentous path into a substantially amorphous condition.

2. The method of claim 1 wherein the spacing between said pulses is much less than 10 microseconds.

3. The method of claim 2 wherein each of said reset current pulses has a width substantially less than 10 microseconds.

4. The method of claim 3 wherein there is at least about 10 pulses in each burst of reset current pulses and substantially less than about 150 pulses.

5. The method of claim 1 wherein the number of said reset voltage pulses and reset current pulses produced thereby are substantially in excess of the number needed to reset all of the resettable portions of the filamentous path to its maximum resistance condition to homogenize the same and prevent crystallization from developing therein under elevated temperature conditions.

6. The method of claim 1 wherein the spacing between the reset current pulse is no greater than about 6 microseconds.

7. The method of claim 1 wherein said memory semiconductor material has the general formula:

$$Ge_A Te_B X_C Y_D$$

where:

A=5 to 60 atomic percent

B=30 to 95 atomic percent

C=0 to 10 atomic percent when X is Antimony (Sb) or Bismuth (Bi)

or

C=0 to 40 atomic percent when X is Arsenic (As)

D=0 to 10 atomic percent when Y is Sulphur (S)

or

D=0 to 20 atomic percent when Y is Selenium (Se).

8. The method of claim 5 wherein each reset current pulse is so low it only resets a small fraction of the filamentous path to an amorphous condition.

9. The method of claim 8 wherein the number of said reset voltage pulses and reset current pulses produced thereby are substantially in excess of the number needed to reset all of the resettable portions of the filamentous path to its maximum resistance condition to homogenize the same and prevent crystallization from developing therein under elevated temperature conditions.

10. The method of claim 7 wherein each of said reset current pulses in each burst of reset current pulses is substantially under 50 milliamps.

11. The method of claim 7 wherein the amplitude of each of said reset current pulses in each burst of reset current pulses is a fraction substantially less than one-half the amplitude required substantially to fully reset the entire crystalline filament, the number of pulses in each burst of pulses being at least about 10, the spacing between said pulses is no greater than about 6 microseconds and the duration of each of said reset current pulses is a small fraction of the spacing between successive pulses.

12. A method of resetting a filament-type memory device including spaced electrodes between which extend a body of generally amorphous non-conductive memory semiconductor material which, when a set voltage pulse in excess of a threshold voltage value and duration is applied to said electrodes has formed therein a crystalline low resistance filament resettable into a generally amorphous condition by application of one or more reset voltage pulses producing reset current pulses through said filament which heat the same to a temperature which dissipates substantially the entire crystalline filament and are of a duration which is so short that upon termination thereof the filament will be quickly quenched to leave at least portions of the filament in a substantially amorphous condition, said method comprising: applying to said electrodes a burst of reset voltage pulses which are so very closely spaced that the temperature of the filament being reset cools only partially to ambient temperature in the interval between successive reset current pulses.

13. In combination, a filament-type memory device including spaced electrodes between which extend a body of generally amorphous non-conductive memory semiconductor material which, when a set voltage pulse in excess of a threshold voltage value and duration is applied to said electrode has formed therein a crystalline low resistance filament resettable into a generally amorphous condition by application of one or more reset voltage pulses producing reset current pulses through said filament of a given amplitude which heat the same to a temperature which dissipates substantially the entire crystalline filament and are of a duration which is so short that upon termination of each reset current pulse the filament will be quickly quenched to leave at least portions of the filament in a substantially amorphous condition; and a source of reset voltage for resetting said path to its initial amorphous condition, said source being selectively connectable to said electrodes for applying thereto for each reset operation a burst of reset voltage pulses spaced apart a fractional part of said recovery period and each of a value in excess of the temporary threshold voltage value, so reset current pulses are produced thereby each of which at least partially converts the crystalline filamentous path into a substantially amorphous condition.

14. The combination of claim 13 wherein the number of said reset voltage pulses and reset current pulses produced thereby are substantially in excess of the number needed to reset all of the resettable portions of the filamentous path to its maximum resistance condition to homogenize the same and prevent crystallization from developing therein under elevated temperature conditions.

15. The combination of claim 13 wherein said memory semiconductor material has the general formula:

$$Ge_A Te_B X_C Y_D$$

where:

A=5 to 60 atomic percent

B=30 to 95 atomic percent

C=0 to 10 atomic percent when X is Antimony (Sb) or Bismuth (Bi)

or

C=0 to 40 atomic percent when X is Arsenic (As)

D=0 to 10 atomic percent when Y is Sulphur (S)

or

D=0 to 20 atomic percent when Y is Selenium (Se).

16. The combination of claim 14 wherein each reset current pulse is so low it only resets a small fraction of the filamentous path to an amorphous condition.

17. The combination of claim 15 wherein the amplitude of each of said reset current pulses in each burst of reset current pulses is a fraction substantially less than one-half the amplitude required substantially to fully reset the entire crystalline filament, the number of pulses in each burst of pulses being at least about 10, the spacing between said pulses is no greater than about 6 microseconds and the duration of each of said reset current pulses is a small fraction of the spacing between successive pulses.

18. The method of claim 1 wherein the spacing between said reset current pulses in said burst of reset current pulses is much less than 10 microseconds.

* * * * *